United States Patent
Ell et al.

(10) Patent No.: US 6,604,121 B1
(45) Date of Patent: Aug. 5, 2003

(54) DIGITAL DIVISION DEVICE AND METHOD USING A REDUCED-SIZED LOOKUP TABLE

(75) Inventors: Travis E. Ell, Oklahoma City, OK (US); John C. Morris, Minneapolis, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/451,695

(22) Filed: Nov. 30, 1999

Related U.S. Application Data

(60) Provisional application No. 60/132,997, filed on May 7, 1999.

(51) Int. Cl.[7] .............................. G06F 7/52; G11B 5/596
(52) U.S. Cl. ........................ 708/650; 708/653; 360/75
(58) Field of Search ................................. 708/650, 652, 708/653, 654, 655, 656, 504, 651; 360/75

(56) References Cited

U.S. PATENT DOCUMENTS

| | | |
|---|---|---|
| 4,412,161 A | 10/1983 | Cornaby |
| 4,466,077 A * | 8/1984 | Iannucci et al. ............ 708/652 |
| 5,105,378 A | 4/1992 | Mori |
| 5,206,647 A | 4/1993 | Stone |
| 5,576,909 A | 11/1996 | Dierkes et al. |
| 5,602,693 A | 2/1997 | Brunnett et al. |
| 5,644,639 A * | 7/1997 | Naciri et al. ................ 235/380 |
| 5,760,990 A | 6/1998 | Ukani et al. |
| 5,774,297 A | 6/1998 | Hampshire et al. |

OTHER PUBLICATIONS

PYE TMC Limited, (untitled book section),(published circa 1980) pp. 254 through 264 and 392.

* cited by examiner

*Primary Examiner*—Chuong Dinh Ngo
(74) *Attorney, Agent, or Firm*—Mitchell K. McCarthy

(57) ABSTRACT

Devices and methods are provided for estimating a high-precision quotient using a smaller-than-conventional lookup table. The devices include a numerator register feeding a numerator value (as a succession of bits or words) into a forward signal path. The forward path includes a partial quotient generator, an accumulator, and a latch. The devices further include a feedback signal path emerging from the latch output, undergoing division by bit-shifting, and terminating as an input to the accumulator. A multiple divide implementation for use in a particular servo control system is also presented.

12 Claims, 10 Drawing Sheets

| DENOMINATOR VALUE 224 | INPUT 226 | OUTPUT 228 |
|---|---|---|
| -- | 0XXXXX | 0000000 |
| 32 | 100000 | 1000000 |
| 33 | 100001 | 0111111 |
| 34 | 100010 | 0111101 |
| 35 | 100011 | 0111011 |
| 36 | 100100 | 0111001 |
| 37 | 100101 | 0111000 |
| 38 | 100110 | 0110110 |
| 39 | 100111 | 0110101 |
| 40 | 101000 | 0110011 |
| 41 | 101001 | 0110010 |
| 42 | 101010 | 0110001 |
| 43 | 101011 | 0110000 |
| 44 | 101100 | 0101111 |
| 45 | 101101 | 0101110 |
| 46 | 101110 | 0101101 |
| 47 | 101111 | 0101100 |
| 48 | 110000 | 0101011 |
| 49 | 110001 | 0101010 |
| 50 | 110010 | 0101001 |
| 51 | 110011 | 0101000 |
| 52 | 110100 | 0100111 |
| 53 | 110101 | 0100111 |
| 54 | 110110 | 0100110 |
| 55 | 110111 | 0100101 |
| 56 | 111000 | 0100100 |
| 57 | 111001 | 0100100 |
| 58 | 111010 | 0100011 |
| 59 | 111011 | 0100011 |
| 60 | 111100 | 0100010 |
| 61 | 111101 | 0100001 |
| 62 | 111110 | 0100001 |
| 63 | 111111 | 0100000 |

| VALUE 234 | INPUT 236 | OUTPUT 238 | VALUE 234 | INPUT 236 | OUTPUT 238 |
|---|---|---|---|---|---|
| 2.000 | 00-0000 | 0000000 | 2.000 | 10-0000 | 1000000 |
| 2.125 | 00-0001 | 0000000 | 2.125 | 10-0001 | 0111100 |
| 2.250 | 00-0010 | 0000000 | 2.250 | 10-0010 | 0111000 |
| 2.375 | 00-0011 | 0000000 | 2.375 | 10-0011 | 0110101 |
| 2.500 | 00-0100 | 0000000 | 2.500 | 10-0100 | 0110011 |
| 2.625 | 00-0101 | 0000000 | 2.625 | 10-0101 | 0110000 |
| 2.750 | 00-0110 | 0000000 | 2.750 | 10-0110 | 0101110 |
| 2.875 | 00-0111 | 0000000 | 2.875 | 10-0111 | 0101100 |
| 3.000 | 00-1000 | 0000000 | 3.000 | 10-1000 | 0101010 |
| 3.125 | 00-1001 | 0000000 | 3.125 | 10-1001 | 0101000 |
| 3.250 | 00-1010 | 0000000 | 3.250 | 10-1010 | 0100111 |
| 3.375 | 00-1011 | 0000000 | 3.375 | 10-1011 | 0100101 |
| 3.500 | 00-1100 | 0000000 | 3.500 | 10-1100 | 0100100 |
| 3.625 | 00-1101 | 0000000 | 3.625 | 10-1101 | 0100011 |
| 3.750 | 00-1110 | 0000000 | 3.750 | 10-1110 | 0100010 |
| 3.875 | 00-1111 | 0000000 | 3.875 | 10-1111 | 0100001 |
| 2.000 | 01-0000 | 0100000 | 2.000 | 11-0000 | 1100000 |
| 2.125 | 01-0001 | 0011110 | 2.125 | 11-0001 | 1011010 |
| 2.250 | 01-0010 | 0011100 | 2.250 | 11-0010 | 1010101 |
| 2.375 | 01-0011 | 0011010 | 2.375 | 11-0011 | 1010000 |
| 2.500 | 01-0100 | 0011001 | 2.500 | 11-0100 | 1001100 |
| 2.625 | 01-0101 | 0011000 | 2.625 | 11-0101 | 1001001 |
| 2.750 | 01-0110 | 0010111 | 2.750 | 11-0110 | 1000101 |
| 2.875 | 01-0111 | 0010110 | 2.875 | 11-0111 | 1000010 |
| 3.000 | 01-1000 | 0010101 | 3.000 | 11-1000 | 1000000 |
| 3.125 | 01-1001 | 0010100 | 3.125 | 11-1001 | 0111101 |
| 3.250 | 01-1010 | 0010011 | 3.250 | 11-1010 | 0111011 |
| 3.375 | 01-1011 | 0010010 | 3.375 | 11-1011 | 0111000 |
| 3.500 | 01-1100 | 0010010 | 3.500 | 11-1100 | 0110110 |
| 3.625 | 01-1101 | 0010001 | 3.625 | 11-1101 | 0110100 |
| 3.750 | 01-1110 | 0010001 | 3.750 | 11-1110 | 0110011 |
| 3.875 | 01-1111 | 0010000 | 3.875 | 11-1111 | 0110001 |

FIG. 4

| VALUE 244 | INPUT 246 | OUTPUT 248 | |
|---|---|---|---|
| 0 | 00000 | 00000100 | ⎫ |
| 1 | 00001 | 00000101 | ⎬ 242 FLAGS |
| 2 | 00010 | 00000110 | ⎭ |
| 3 | 00011 | 01010101 | |
| 4 | 00100 | 01000000 | |
| 5 | 00101 | 00110011 | |
| 6 | 00110 | 00101010 | |
| 7 | 00111 | 00100100 | |
| 8 | 01000 | 00100000 | |
| 9 | 01001 | 00011100 | |
| 10 | 01010 | 00011001 | |
| 11 | 01011 | 00010111 | |
| 12 | 01100 | 00010101 | |
| 13 | 01101 | 00010011 | |
| 14 | 01110 | 00010010 | |
| 15 | 01111 | 00010001 | |
| −16 | 10000 | 11110000 | |
| −15 | 10001 | 11101111 | |
| −14 | 10010 | 11101110 | |
| −13 | 10011 | 11101101 | |
| −12 | 10100 | 11101011 | |
| −11 | 10101 | 11101001 | |
| −10 | 10110 | 11100111 | |
| −9 | 10111 | 11100100 | |
| −8 | 11000 | 11100000 | |
| −7 | 11001 | 11011100 | |
| −6 | 11010 | 11010110 | |
| −5 | 11011 | 11001101 | |
| −4 | 11100 | 11000000 | |
| −3 | 11101 | 10101011 | ⎫ |
| −2 | 11110 | 10000110 | ⎬ 242 FLAGS |
| −1 | 11111 | 10000101 | ⎭ |

FIG. 6 _PRIOR ART_

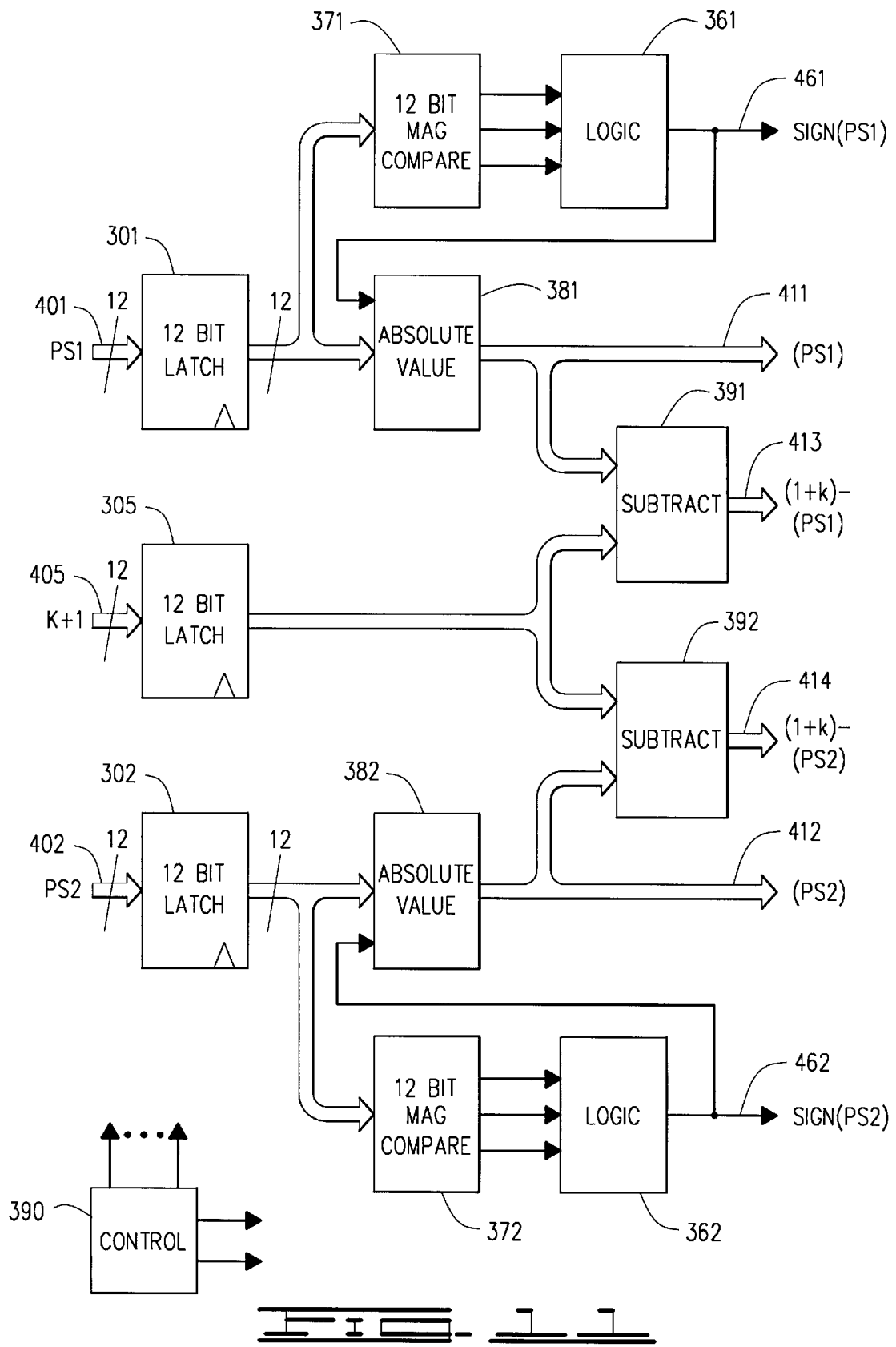

DIGITAL DIVISION DEVICE AND METHOD USING A REDUCED-SIZED LOOKUP TABLE

RELATED APPLICATIONS

This application claims the benefit of U.S. Provisional Application No. 60/132,997 filed on May 7, 1999.

FIELD OF THE INVENTION

The present invention relates generally to digital dividers, and more particularly to devices and methods able to estimate a digital quotient of several bits in about 5 to 500 clock cycles.

BACKGROUND OF THE INVENTION

Fast digital dividers generally fall into one of two categories: calculation-type and lookup-type. Although designing logic to calculate a quotient with greater precision is not difficult, the number of gates becomes exponentially more costly for each additional bit of precision required. As a result, calculation-type dividers typically provide only a few bits of precision.

Lookup-type dividers receive an input that combines the numerator and denominator. They then output a quotient retrieved from a table, typically implemented in read-only memory (ROM). Like the logic of calculation-type dividers, expanding ROM to enhance precision is not complex but quickly become unwieldy as precision increases further.

As a result, applications which require greater precision often resort to doing so in software. This greatly reduces the speed with which division can be performed. For ascertaining quotients in time-critical applications such as a motion controller that senses its position each millisecond, there is a continuing need for a precise digital divider that is faster than a code-implemented divider and more precise than a typical calculation-type or lookup-type divider.

SUMMARY OF THE INVENTION

Devices and methods are provided for estimating a quotient efficiently, using a table that is smaller than that of a conventional lookup-type divider of a like precision. The devices include a numerator register feeding a succession of bits or words comprising the numerator value into a forward signal path. The forward path includes a partial quotient generator (PQG) able to generate a succession of signals indicative of portions of the quotient. After passing through an accumulator, each partial quotient is then latched. The devices further include a bit-shifting feedback signal path emerging from the latch output and terminating into another input of the accumulator. The devices further include control circuitry for triggering the numerator register(s) and/or the latch(es) to change state.

Methods of the present invention include steps of receiving a numerator and a denominator each as a digitized value, parsing the numerator, providing at least a portion of the numerator with the denominator to a PQG, and latching the output. The methods further include reducing the result approximately by a factor of about 2 (or 4 or some larger power of two) summing the reduced result with at least one additional value obtained from the PQG.

A most preferred device of the present invention finds advantageous use in a disc drive servo control system, the device calculating a formula taking the general form (F/G)/(F/G+H/J).

BRIEF DESCRIPTION OF THE DRAWINGS

FIG. 4 shows the operation of a PQG table compatible with FIG. 2, using 2-bit numerator portions.

FIG. 10 shows a nominal position error signal curve corresponding to the servo loop of FIG. 6.

FIG. 11 shows part of a servo control system embodiment of the present invention, the part which generates values to be divided.

DETAILED DESCRIPTION

Numerous aspects of digital circuit design that are not a part of the present invention (or are well known in the art) are omitted for brevity. These include (1) transistor configurations of basic gates, memory cells, and latches; (2) transistor configurations of basic mathematical blocks such as accumulators, comparators, and sign extractors; and (3) specific sequencing and related control circuitry. Although each of the many examples below shows more than enough detail to allow those skilled in the art to practice the present invention, subject matter regarded as the invention is broader than any single example below. The scope of the present invention is distinctly defined, however, in the claims at the end of this document.

Figure 1:
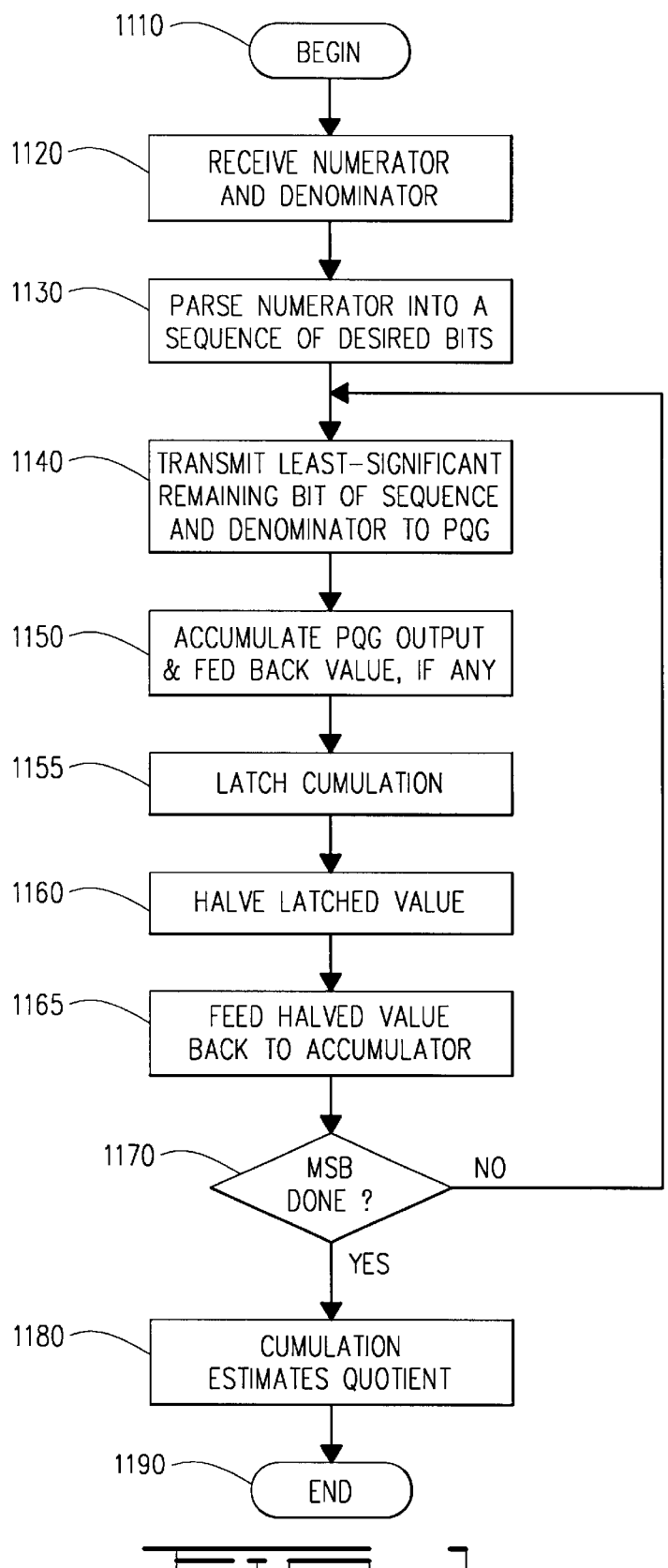
FIG. 1 shows a preferred method of the present invention.

FIG. 1 shows a preferred method of the present invention in steps 1110 through 1190. A numerator and denominator are received 1120 and the numerator is parsed 1130 into a most significant portion and one or more additional portions. Each "portion" consists of one or more bits, increasing the precision of the estimated quotient by a like number of bits up to a point. Each additional period also adds one latch period to the computation, as shall be explained with reference to the device implementations described below. The sequence generated in step 1130 begins with a least significant retained bit and ends with the highest value-indicative bit (e.g. omitting leading zeros in binary expressions, omitting extra leading ones in a negative two's complement expression, etc.). For example, it may be better to express a numerator value of −9 (decimal) as an 8-bit two's complement number (i.e., 11110111) rather than a 16-bit two's complement number (i.e., 1111111111110111). Trimming the left-most 8 bits, which are not value-indicative, can halve the calculation time. In one preferred embodiment, a priori knowledge about the magnitude of one or both operands is used to discard extra upper bits in this manner. Desirably, step 1130 further discards one or more least-significant bits so that the sequence will have a fixed length of about 8–24 bits of precision.

Once the sequence is defined, an iterative process begins. The sequence's least significant (remaining) bit is provided (with the denominator) as an input to the partial quotient generator (PQG) 1140, and the PQG output is accumulated with a fed back value 1150 (typically initialized at zero). The accumulator's output is latched 1155, and its latched value is bit-shifted 1160 and fed back 1165 as another input to the accumulator. The iterative process is repeated until the most significant bit has been processed 1170 to signal the conclusion of the iterative process. Once the entire sequence has been processed in this way, the latched value is output as the estimated quotient 1180.

Figure 2:
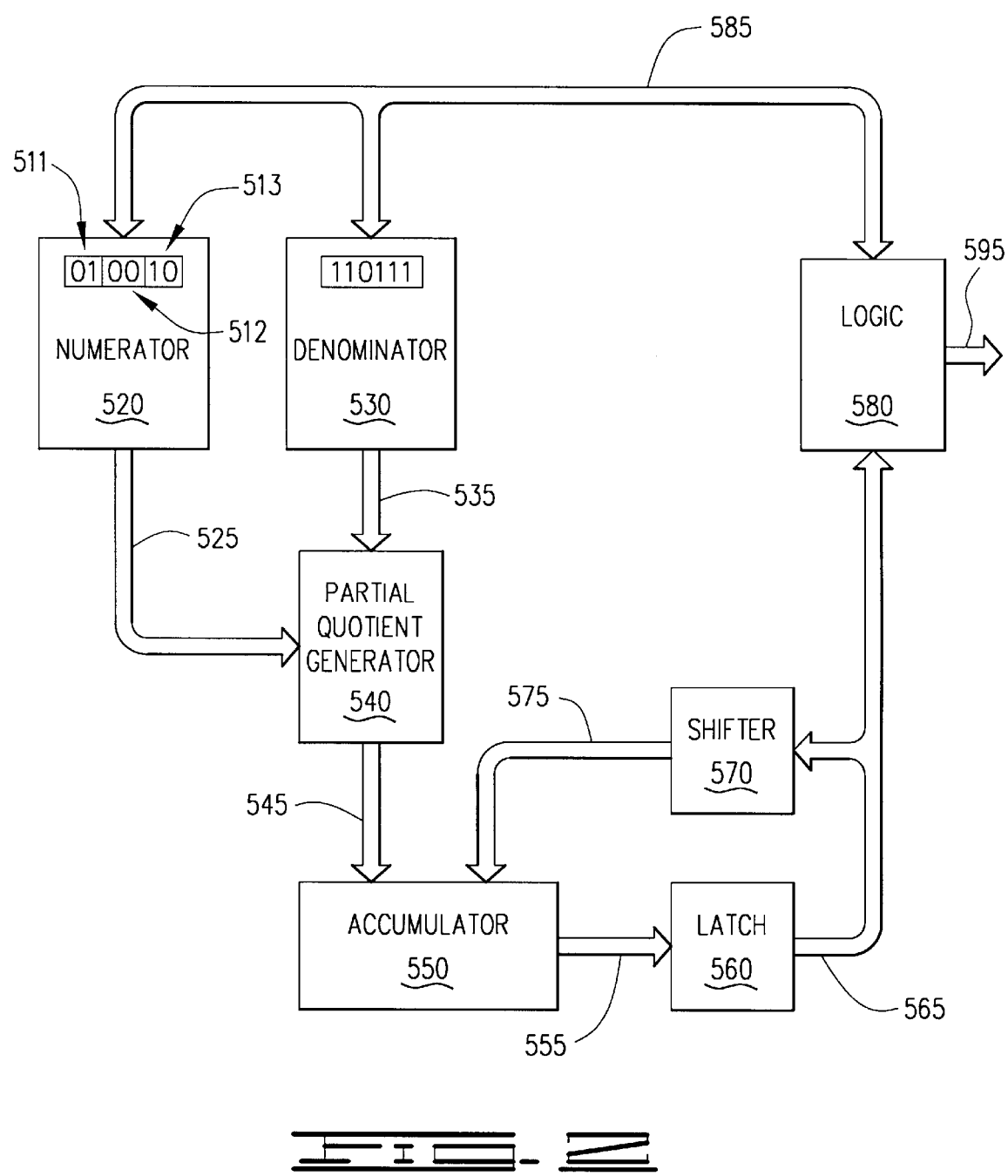
FIG. 2 shows a device configuration suitable for performing a method of the present invention.

FIG. 2 shows a device configuration suitable for performing a method of the present invention. A numerator register 520 and a denominator register 530 contain the operands, the numerator being parsed into a most significant portion 511 (having a value of 1 binary), a second-most significant portion 512 (having a value of zero), and a third-most significant portion 513 (having a value of 10 b). In the first cycle, two bits 525 from the numerator's least-significant portion 513 and a six-bits 535 from the denominator register 530 are passed as inputs to the PQG 540. The PQG 540, typically implemented as a memory or as digital logic, asynchronously outputs a partial quotient signal 545.

The accumulator 550 (typically a basic summing element) produces an output 555 indicative of accumulated partial quotients, which passes through latch 560 as an output 565. Control logic 580 passes latch output 565 as a device output 595 when the most recent numerator portion 525 represents the last portion (i.e., the most-significant bit 511) of the sequence. For other portions, latch output 565 enters a feedback signal path comprising 2-bit shifter 570, which provides an output 575 (reduced by a factor of about 4) coupled to the second input of accumulator 550. In a preferred embodiment like that exemplified below as FIGS. 5 & 6, logic 580 feeds back values 585 derived from the estimated quotient (system output 595) to one or both operand registers 520,530.

Figure 3:
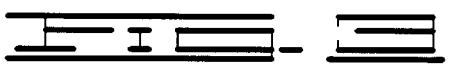
FIG. 3 shows the desired functionality of a partial quotient generator (PQG) table suitable for a single-bit numerator parser (i.e., a shift register or serializer) and a 5-bit denominator register.

FIG. 3 shows the desired functionality of a partial quotient generator table suitable for a single-bit numerator parser (i.e., a shift register or serializer) and a 5-bit register which contains values signifying a 6-bit denominator value. These six bits constitute the input 226 to the PQG. As a numerical example, suppose that a numerator portion having a value equal to 1 and a denominator having a value (indicated at 224) equal to 43 is supplied to the PQG. These values correspond to an input signal value 226 of 101011 and a PQG output value 228 of 0110000. It should be noted that the first input digit technically constitutes a numerator input bit, and that the remaining five bits supplement a presumed (omitted) initial denominator bit of 1 (101011 b=43 decimal). Each output value 228 (except the first) then represents a reciprocal of this value, the bits shown to be interpreted as being preceded by "0.0000" (in base two). The table thus indicates that 1/43 (decimal) is approximately equal to 0.00000110000 (binary).

X's in the input 226 signify ignored bits, indicating that gates cause the other inputs to be ignored when the left-most bit is zero, saving memory space. Irrespective of the denominator, a numerator bit (left-most) of 0 will produce an output of 0000000. Having predetermined limits to the range of allowed denominator values 224 (i.e. 32 to 63, in the present example) allows higher accuracy in an implementation of a PQG. Range limits are desirably defined by a priori knowledge of the environment, where possible. Having range limits that differ by a factor of about two or about four, however, adequately allows control logic or firmware to bit-shift the denominator and/or quotient (or its interpretation) so that the precision of the less-precise operand can be maintained in the estimated quotient. For example, the present table can likewise be interpreted as containing denominator values 224 ranging from 16 to 31.5 (in increments of 0.5), 8 to 15.75 (in increments of 0.25), or any other range of positive numbers spanning a factor of about 2.

Bit-shifting the result to accommodate this scaling may be appropriate in some contexts, but is not fundamental the practice of the present invention. Each of these transformations merely moves the binary "decimal point" by one place, a fact which a programmer may find useful in interpreting the quotient value. A programmer or digital designer may optionally perform whatever denominator bit-shifting is required identically upon the numerator, not affecting the quotient. The number of bits of quotient precision expected (designated as L) must usually be no larger than the number of bits of numerator or denominator precision. To minimize circuitry for a basic division of positive numbers, an efficient and versatile embodiment uses a table of this form implemented in a memory containing about $2^L$ words each having at least L bits.

FIG. 4 shows the operation of a partial quotient generator (PQG) table compatible with FIG. 2, using numerator portions of two bits. For clarity, each six-bit input value 236 of the table includes a hyphen separating the two numerator bits and the five bit denominators (interpreted as positive binary values with an implied MSB of 1). Thus, L=5 for this implementation. According to the preceding formula, a memory of about 32 words is thus required, but 64 are provided in order to allow for more than one numerator bit in each numerator portion.

Suppose that the PQG 540 of FIG. 2 is implemented with the table of FIG. 4, and that operands as shown in FIG. 2 are used. Dividing 18 (decimal, equal to 10010 binary) by 3.4375 (11.0111 binary), one would expect a result of about 5.236 (101.001 binary). In the first iteration, registers 520, 530 provide an input value of 10-1011 to PQG 540 (omitting the first denominator bit and discarding the last). PQG table input value 236 of 10-1011 results in an output value 238 of 0100101 (see FIG. 4). This passes through the rest of the forward signal path (i.e. through accumulator 550 and latch 560) without modification, assuming residual value 575 is initially zero. Latched value 565 is bit-shifted twice, discarding the least significant bits, and thus becomes fed-back value 575 of 1001. The accumulator's higher-order bytes are sign extended (i.e. made to be zero, so that the fed-back value is not changed by their presence).

In the second iteration, PQG 540 receives 00-1011 and generates 0000000. Accumulator 550 adds this PQG output value 545 to the fed-back value 575 (equal to 1001) so that accumulator output value 555 is 0001001, which is latched and fed back as 0000010 as the third iteration begins.

In the third iteration, PQG 540 receives 01-1011 and generates 0010010, which is received and added to 0000010 by accumulator 550. When this sum value 565 (equal to 0010100) is latched and control logic 580 ascertains that the division operation is complete, a quotient estimate 595 (indicating a value of 101.00) is generated. Note that this value corresponds well (to 101.001, the expected result), has five bits of precision because this is the limit of a 16-value denominator range. Yet it has been obtained in only 3 iterations (one for each latch/numerator trigger). This speed results from the fact that partial quotients are obtained by a lookup operation (rather than a bona fide calculation) and that each numerator portion comprised more than one bit.

Note that trimming the least significant bits 513 so that the numerator sequence comprises only two portions 511,512 would shorten the calculation time to two iterations, but would reduce the precision from 5 bits to 3 bits. Such trimming prior to receiving the numerator into the register 520 is desirable where leading bits are redundant or where the least significant portion of a preliminary numerator are known or not needed.

Figure 5:
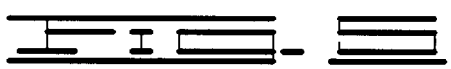
FIG. 5 shows a third PQG table of the present invention featuring two's complement table entries.

FIG. 5 shows a third PQG table of the present invention, compatible with FIG. 1, in a somewhat more versatile embodiment than those of FIGS. 3 & 4. The embodiment is more versatile in that negative input values are 244 are correctly handled by providing input values 246 and output values 248 in two's complement format. PQG output signals an error condition when the denominator value 246 sufficiently close to zero (i.e., within 2). The error condition can be detected by a simple combination of gates detecting the pattern X00001XX in the output values (i.e. whether they are flag values signaling an error or other exception to be handled differently).

Dividing 96 (01100000 in 8-bit 2's complement) by −14 (11110010 in 8-bit 2's complement), one would expect a result of about −6.9 (about 11111001 in 8-bit 2's complement). Before iterations, referring to FIG. 1, values are received 1120 and parsed 1130 to generate a 3-bit numerator sequence (corresponding to a desired degree of precision less than that apparently attainable from the table judging by the input word size, 5 bits). The sequence is 0 (least significant), 1 (intermediately significant), and 1 (most significant).

In the first iteration, steps 1140 through 1170 (of FIG. 1) result in zero being fed back. (In a preferred embodiment, a latch and/or extra logic gates are provided so that the table is not even accessed unless the numerator portion is nonzero and the denominator is different from the last-accessed. In general, this is well within the skill of a digital designer.)

In the second iteration, the table input address 246 is equal to 10010 (the top three bits ignored, being redundant sign bits in the present simplified example). The resulting PQG table output value 248 (equal to 11101110) is thus accumulated 1150 and latched 1155. Then it is halved with sign-extend 1160 to generate halved value 11110111, which is fed back 1165 to the accumulator.

In the third and final iteration, the PQG again generates an output value 248 equal to 11101110. This is accumulated 1150 with the fed-back value to produce a calculated cumulation of 11100101 (interpreted as 111001.01 in 8-bit two's complement, very close to the expected result of −6.9).

Methods and devices of the present invention described in conjunction with FIGS. 1–5 provide a desirable combination of speed and compactness suitable for a wide variety of relatively sophisticated functions involving several divide operations. The present invention can generally be used to evaluate a function of the form $$P = \frac{(F/G)}{(F/G) + (H/J)} \quad \text{(Eq. 1)}$$

in 3 L cycles, where L is the number of bits of precision desired (but not more than that of any of the operands F, G, H, and J). Suppose L=12. One can divide F/G, divide H/J, sum the results, and divide first of these results by the sum. Each of these 12-cycle divisions is done using the same PQG and accumulator (to avoid duplicating circuitry). The addition is done in parallel. As explained above, these calculations can also be accelerated by triggering more often (such as by every clock transition) or by using numerator portions greater than one bit. Note that if the first denominator summand F/G required an unrelated division operation, an equation like Eq. 1 would instead take about 4 L cycles.

Figure 6:
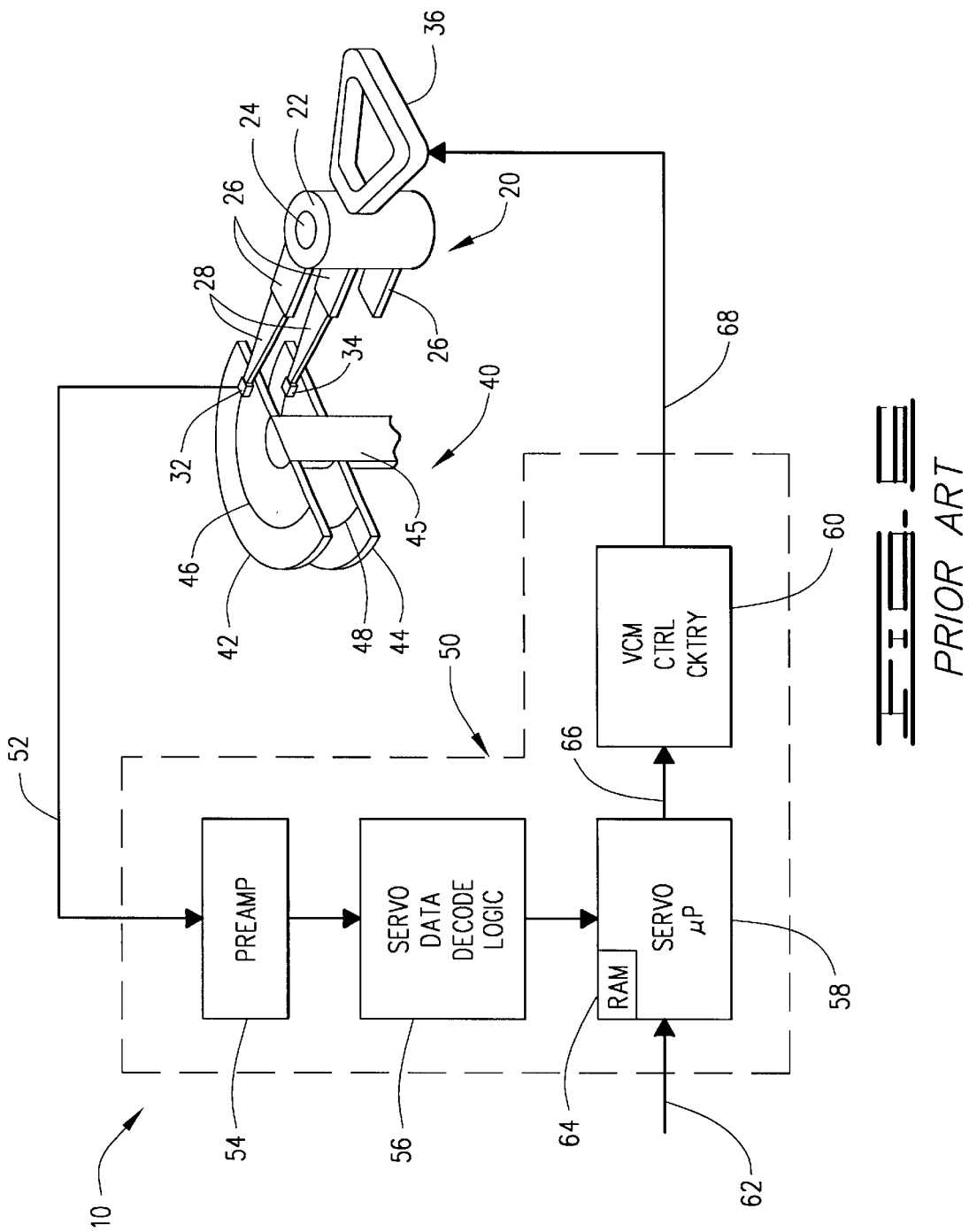
FIG. 6 shows a functional block representation of a prior art servo system for a disc drive.

As it turns out, devices of the present invention are a preferred divider in control applications where timely and accurate quotient estimates are needed. FIG. 6 shows a functional block representation of a such an application, a servo system for a disc drive (generally denoted as 10). The disc drive 10 includes an actuator assembly 20, a disc stack 40 and a servo loop 50, with the servo loop 50 operably controlling radial position of the actuator assembly 20 with respect to the disc stack 40.

The actuator assembly 20 comprises an actuator body 22 that pivots about a pivot shaft 24. The actuator body 22 includes arms 26 that extend radially as shown from the actuator body 22, and flexures 28 extend from each of the arms 26. Mounted at the distal end of each of the flexures 28 is a head (two shown in FIG. 6 at 32 and 34, respectively). Additionally, an actuator coil 36 is mounted to the actuator body 22 opposite the arms 26. The coil 36 is part of a conventional voice coil motor (VCM) comprising the coil 36 as well as a pair of permanent magnets (not shown) located above and below the coil 36, so that the coil 36 moves through the magnetic field established by these magnets as the actuator body 22 pivots about the pivot shaft 24.

The disc stack 40 comprises a plurality of discs (two shown in FIG. 6 as 42 and 44, respectively) mounted to a shaft 45 for rotation at a constant high speed by a conventional spindle motor (not shown). The surfaces of the discs 42 and 44 comprise a plurality of radially concentric tracks (two shown at 46 and 48, respectively).

It will be recognized that in a typical disc drive there will be one head per disc surface, but for purposes of clarity only two heads 32 and 34 have been shown in FIG. 6 corresponding to the top surfaces of the discs 42 and 44. It will further be recognized that servo information will be prerecorded on at least one of the surfaces of the discs 42, 44 to provide the requisite servo positioning information to the servo loop 50. In a dedicated servo system one surface of one disc is designated as a dedicated servo surface (such as the top surface of the disc 42) so that servo information is prerecorded on all of the tracks (including track 46) and user data is stored on the remaining disc surfaces) such as on track 48 of the disc 44). In such a case the head 32 would be a servo head and the head 34 would be a data head. Alternatively, in an embedded servo system, the servo information is intermittently prerecorded on all of the tracks, so that each of the tracks 46 and 48 would contain both servo information and user data and the heads 32 and 34 would operate as both a servo and a data head. The present invention is not dependent upon the type of servo system implemented; however, for purposes of clarity it is contemplated that at least track 46 includes servo information that is read by the head 32 and provided to the servo loop 50.

The servo loop 50 receives the servo information from the head 32 on signal path 52 and this servo information is amplified by a preamp circuit 54 and provided to servo data decode logic circuitry 56. The servo data decode logic circuitry 56 includes an analog to digital converter (ADC) so that selected digital representations of the servo information are provided to a servo microprocessor 58. The servo microprocessor 58 generates the aforementioned SPE signal from the servo information and uses the SPE signal to generate and output a correction signal to VCM control circuitry 60. The servo microprocessor 58 determines the correction signal in accordance with commands received by a disc drive system microprocessor (not shown) by way of signal path 62 and programming steps stored in random access memory (RAM) 64. The correction signal is provided by way of signal path 66 to VCM control circuitry 60, which includes a power amplifier (not shown) that outputs a controlled direct current (DC) of a selected magnitude and polarity to the coil 36 by way of signal path 68 in response to the correction signal. Thus, during track following mode, the servo information indicates the relative position error of the head 32 with respect to the center of the track 46 and the correction signal causes a correction in the DC current applied to the coil 36 in order to compensate for this position error and move the head 32 to the center of the track 46. Further discussion of the construction and operation of servo loop 50 can be found in U.S. Pat. No. 5,774,297 (Hampshire et al.); U.S. Pat. No. 5,602,693 (Brunnett et al.); U.S. Pat. No. 5,262,907 (Duffy et al.); and U.S. Pat. No. 5,136,439 (Weispfenning et al.).

Figure 7:
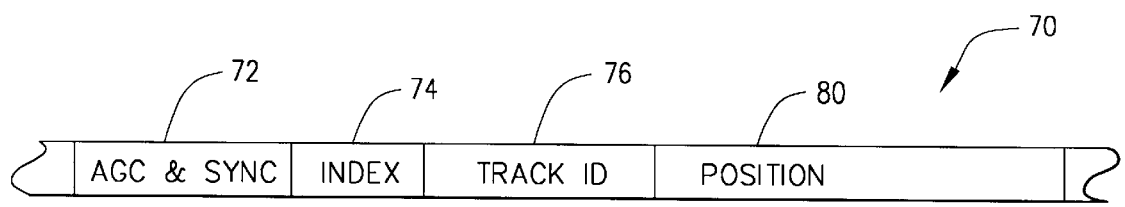
FIG. 7 shows a prior art servo frame featuring an Automatic Gain Control & Sync field, an index field, a track identifier field, and a position field.

As will be recognized, the servo information is recorded during the manufacturing of the disc drive 10 using a highly precise servo writer. The servo information serves to define the boundaries of each of the tracks and is divided circumferentially into a number of frames. The general format of one such frame 70 is shown in FIG. 7. More particularly, FIG. 7 shows the frame 70 to comprise a plurality of fields, including an AGC & Sync field 72, an index field 74, a track ID field 76 and a position field 80. Of particular interest is the position field 80, but for purposes of clarity it will be recognized that the AGC and Sync field 72 provides input for the generation of timing signals used by the disc drive 10, the index field 74 indicates radial position of the track and the track ID field 76 provides the track address. Of course, additional fields may be used as desired and the format of the fields in a servo frame will depend upon the construction of a particular disc drive; for more detailed discussion of typical servo fields see U.S. Pat. No. 5,262,907 (Duffy et al.); U.S. Pat. No. 5,602,693 (Brunnett et al.); or U.S. Pat. No. 5,136,439 (Weispfenning et al.).

Figure 8:
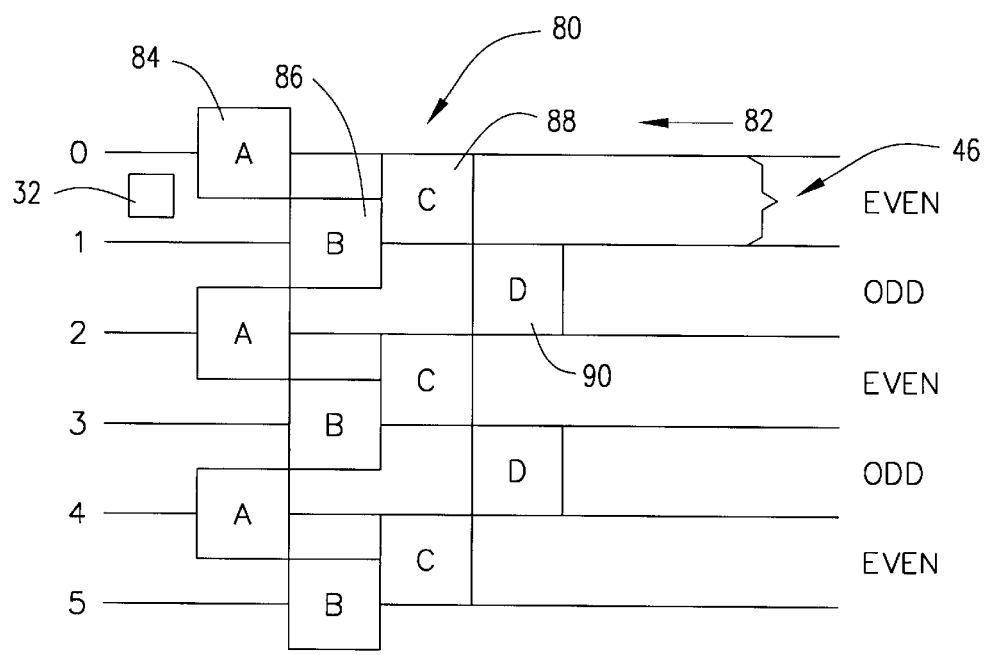
FIG. 8 shows the prior art position field of FIG. 7 featuring burst patterns A, B, C and D having selected geometries and magnetization vectors, defining several track boundaries.
Figure 8:
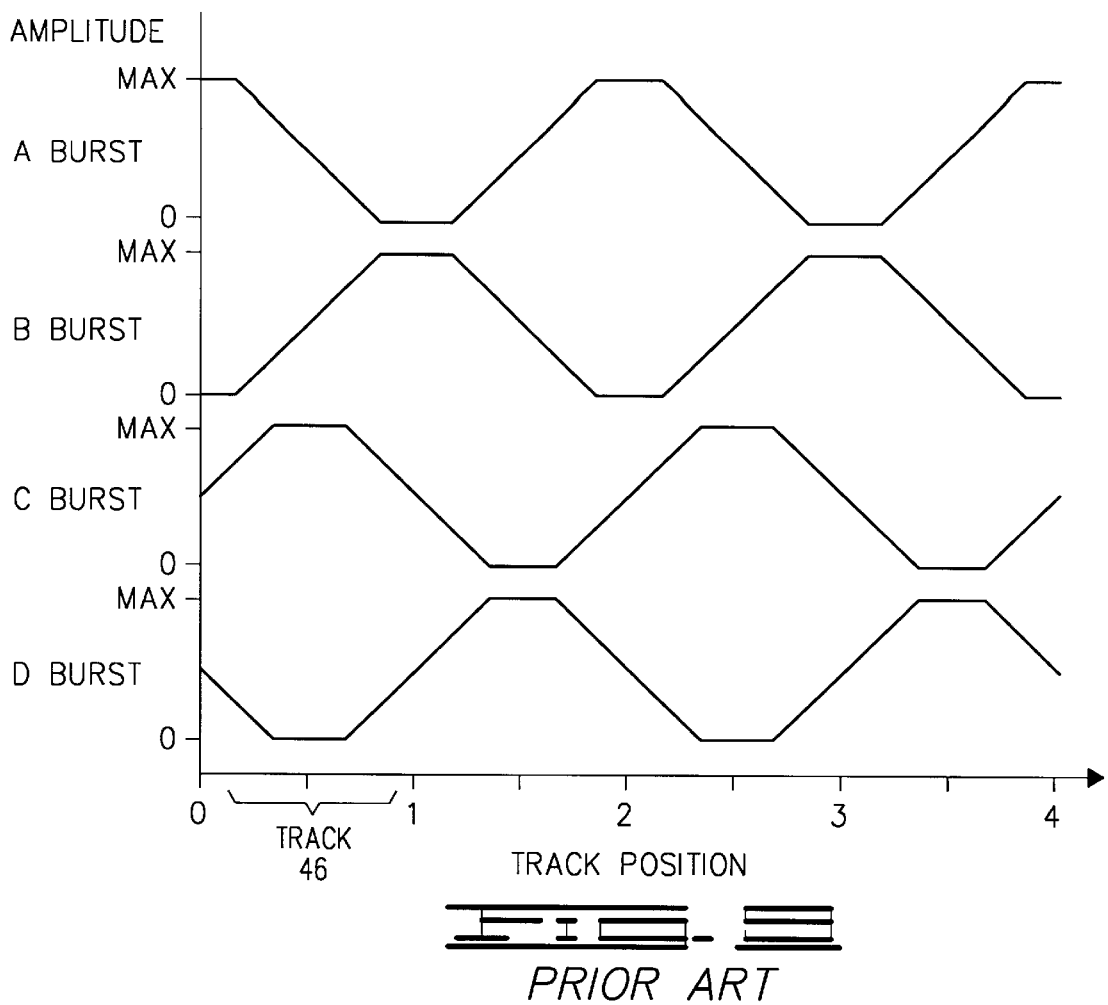

The position field 80 comprises four position burst fields arranged in an offset, quadrature pattern for a plurality of adjacent tracks, as shown in FIG. 8. More particularly, FIG. 8 shows the position field 80 to comprise burst patterns A, B, C and D having selected geometries and magnetization vectors, defining a plurality of track boundaries identified as 0 to 5. Thus, each track comprises the area bounded by two adjacent track boundaries (e.g., the track 46 of FIG. 6 is represented in FIG. 8 to be bounded by the track boundaries 0 and 1). Additionally, the head 32 of FIG. 6 is represented in FIG. 8 as being centered on the track 46. The direction of rotation of the disc stack 40 (and hence the position field 80) relative to the head 32 is shown by arrow 82.

Both the A and B burst patterns are shown to extend from the center of one track to the center of an immediately adjacent track, with these patterns offset in a "checkerboard" fashion. Additionally, the C and D burst patterns extend from one track boundary to the next track boundary, with these patterns also offset as shown. Thus, as the head 32 passes over the position field 80 on track 46, the head will pass over portions of the A and B burst patterns (identified as 84 and 86, respectively) and then over C burst pattern 88. However, the head 32 will not encounter D burst pattern 90, as this pattern is on an adjacent track. For reference, tracks having C burst patterns are referred to as "even tracks" and tracks with D burst patterns are referred to as "odd tracks".

Generally, it will be recognized that when the head 32 is "centered" on the mid-point of track 46, the amplitude of an A burst signal induced in the head 32 by the A burst pattern 84 will be equal to the amplitude of a B burst signal induced in the head by the B burst pattern 86. Moreover, the amplitude of a C burst signal induced by the C burst pattern 88 will have a maximum value and the amplitude of a D burst signal from the D burst pattern 90 will be nominally zero. Further, when the head 32 is positioned over the track boundary 1, the amplitudes of the C and D burst signals from the patterns 88 and 90 will be equal in magnitude, the B burst signal from the pattern 86 will have a maximum value and the A burst from the pattern 84 will be zero. Thus, as the head 32 is swept from one track boundary to the next, the amplitudes of the A, B, C and D burst signals cycle between zero and maximum values, as illustrated by FIG. 9.

Figure 9:
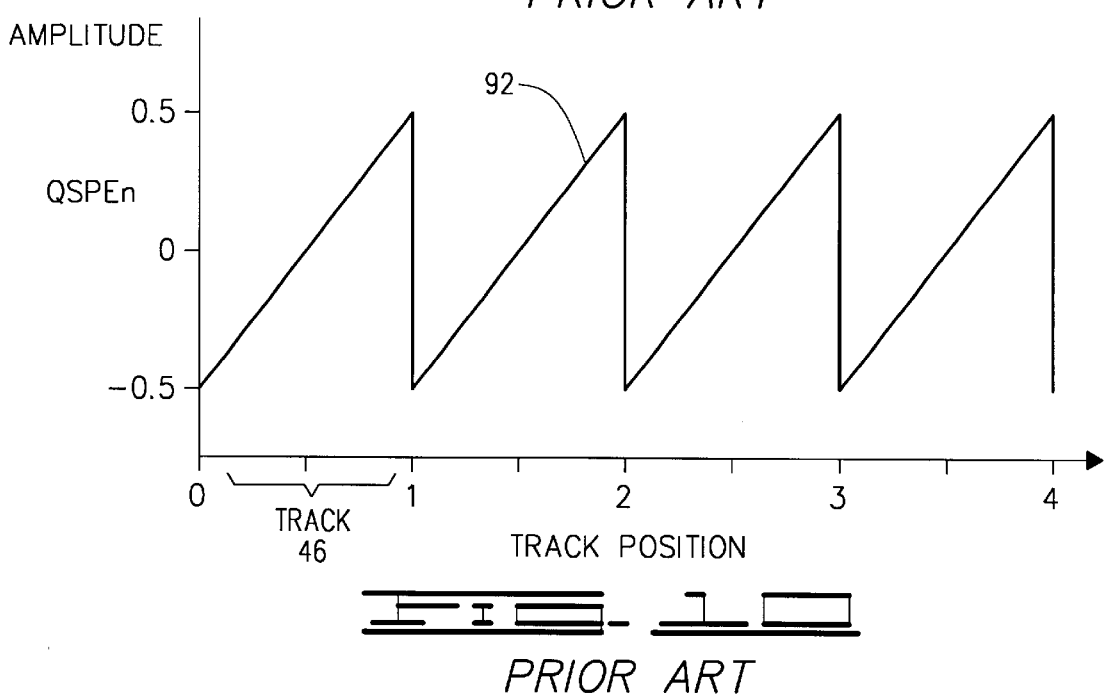
FIG. 9 shows the amplitudes of the A, B, C and D burst signals corresponding to the prior art patterns of FIG. 8.

FIG. 9 provides a graphical representation of the amplitudes of the A, B, C and D burst signals as the head 32 is moved from track boundary 0 to track boundary 4 in FIG. 8. More particularly, FIG. 9 plots each of the burst signals along a common horizontal axis indicative of radial track position and an aligned vertical axis indicative of the amplitude for each of the burst signals from a value of zero to a maximum value. As in FIG. 8, the track 46 is shown in FIG. 9 to comprise the interval between the values of 0 and 1 on the horizontal axis. It will be recognized that both the A and B burst signals and the C and D burst signals can be viewed as being 180 degrees out of phase, respectively and that the A and B burst signals are offset by 90 degrees from the C and D burst signals, respectively.

As explained more fully hereinbelow, the servo system of FIG. 6 relies on the amplitudes of the A, B, C and D burst signals shown in FIG. 9 to generate the SPE signal, which as provided hereinabove is used to generate the correction signal for controlling the position of the head 32. More particularly, the servo system of FIG. 6 first generates a Quadrature SPE signal wherein digital representations of the amplitudes shown in FIG. 9 are provided to the servo microprocessor 58, which determines the following phase values generally of the form $$\text{phase value} = \frac{(A.sub.n - B.sub.n)(scale)}{2(A.sub.n + B.sub.n)} \quad \text{(Eq. 2)}$$

where A.sub.n, B.sub.n, C.sub.n and D.sub.n are the digital representations of the amplitudes of the A,B, C and D burst signals respectively, for each sample n; and (scale) represents a head to track geometric scaling factor determined by:

$$\text{scale} = (\text{head width/track width}). \quad \text{(Eq. 3)}$$

The Quadrature SPE (QSPE) signal comprises a composite of selected portions of the four QSPE phase values, depending upon the relative position of the head with respect to the track and the track type (even or odd), one of the four QSPE phase values will be selected as the value of the QSPE signal. Initially, however, the general shape of the composite QSPE signal is shown in FIG. 10.

Referring to FIG. 10, shown therein is a nominal QSPE signal curve 92 having an amplitude that ranges essentially in a linear fashion from a minimum value of −0.5 to a maximum value of +0.5 as the head is positioned across one track boundary to the next. That is the QSPE signal has a nominal value of zero when the head is positioned at the center of a track and the QSPE signal increases and decreases, respectively, in a linear fashion as the head is positioned toward the track boundaries. In this way, the amplitude and polarity of the QSPE signal indicate the relative distance and direction of the position of the head with respect to the track center and can thus be used to generate the appropriate correction signal to move the head to the center of the track. It will be readily understood that during operation in the servo loop 50 of FIG. 6, the QSPE signal ranges from minimum to maximum digital values and these digital values correspond to the values shown on the vertical axis of FIG. 10.

To improve upon the prior art servo systems described with reference to FIGS. 6–10, Applicants have determined that the following formula provides an excellent approximation of the Position Error Signal described above for a wide variety of heads:

$$PES = \frac{\frac{|PS1|}{[1+K-|PS1|]} \times \frac{S(PS1)S(PS2)}{2}}{\frac{|PS1|}{[1+K-|PS1|]} + \frac{|PS2|}{[1+K-|PS2|]}} \quad \text{(Eq. 4)}$$

where PS1=A−B, PS2=C−D, S(x) means "the sign of x", and K is a constant relating to the geometry of each particular head. K is usually a small positive number (about 0 to 8) and is easy to determine empirically from any of a variety of measured position values. Note that this formula is of the same form as Eq. 1.

Unfortunately, Applicants were not aware of any digital divider able to compute divisions of this complex form with sufficient speed, accuracy and efficiency to implement this formula in a real-time servo control system. Fortunately, the present invention overcomes this computing block.

FIG. 11 shows part of a most-preferred and narrow embodiment of the present invention. Latch 301 holds a digitized estimate of PS1 (labeled 401). Latch 302 holds a digitized estimate of PS2 (labeled 402). Latch 305 holds a digitized estimate of K+1. Logic block 361, comparator 371, absolute value block 381, and subtracter 391 generate intermediate calculations 411,413,461 as shown. Logic block 362, comparator 372, absolute value block 382, and subtracter 392 generate intermediate calculations 412,414,462 as shown. Synchronous blocks receive trigger signals from control circuitry 390, typically on clock cycle boundaries or clock transitions.

Figure 12:
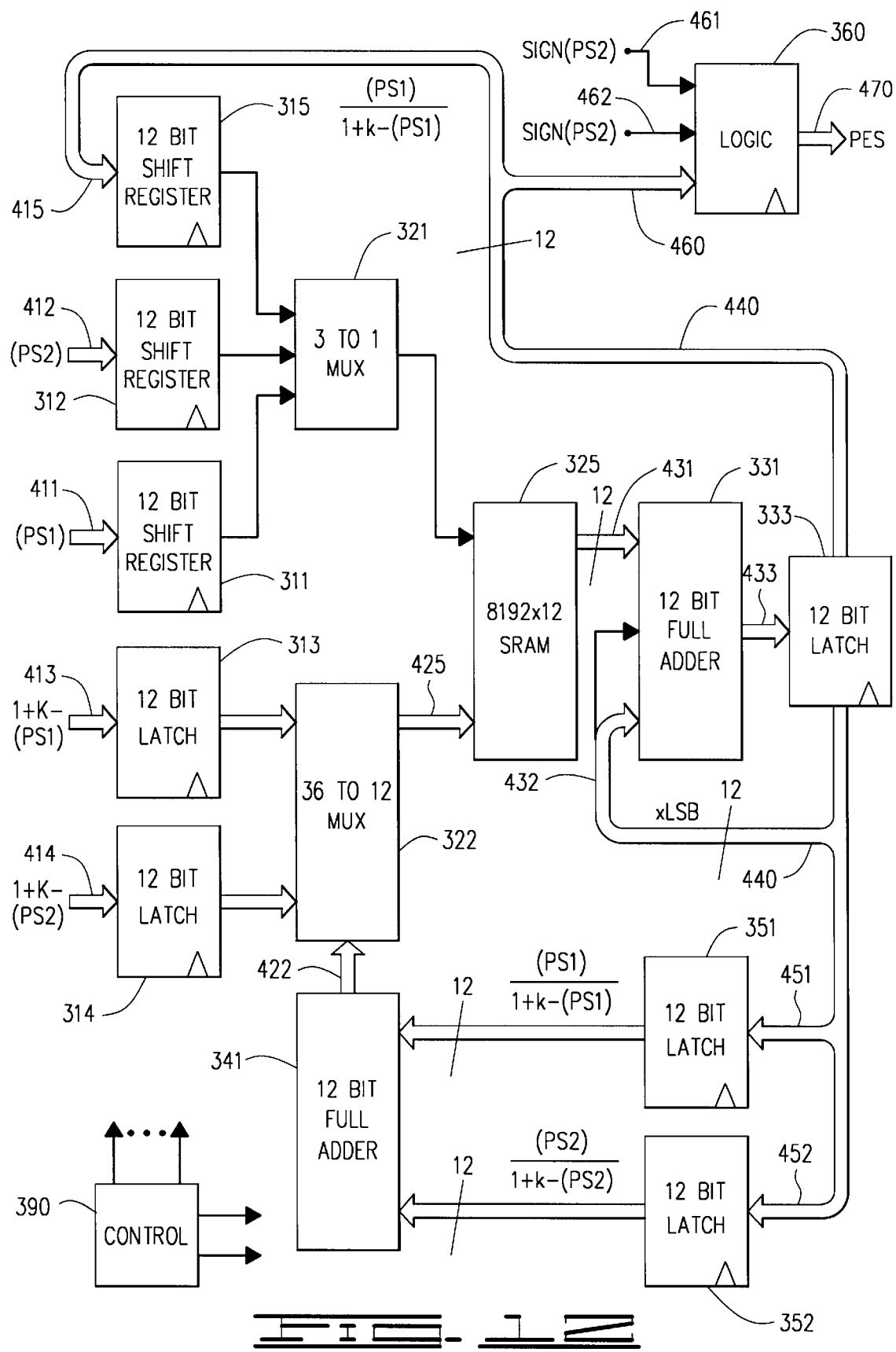
FIG. 12 shows the remainder of the embodiment of FIG. 11, exemplifying exactly how the present invention can be used as a building block in a relatively complex calculation implemented in hardware.

FIG. 12 shows the remainder of the embodiment of FIG. 11, exemplifying exactly how a formula of the form of Eq. 1 can be implemented, and featuring a partial quotient generator that includes static random access memory (SRAM) 325. Intermediate calculations 411,412,413,414 are respectively provided as inputs to 12-bit latches 311,312 and shift registers 313,314. The shift registers 313,314 provide single-bit outputs to two of the three inputs of 3 to 1 multiplexer 321. The latches 311,312 provide 12-bit outputs to 2 of the three 12-bit input ports of a 36 to 12 multiplexer 322. The 13 output lines of the multiplexers 321,322 are received into the address lines of SRAM 325, which then provides 12 data lines 431 to a first input of a 12-bit adder 331. The adder output 433 enters a 12-bit latch 333, which synchronously generates a 12-bit latched divider output value 440 to several places. Value 440 becomes an input value 415 to a 12-bit shift register that is coupled to the last input port of multiplexer 321. Value 440 also undergoes bit-shifting, sign-extending, and discarding its least-significant bit, the result becoming an input value 432 to the other port of the adder 331. Also, the value 440 becomes an input value 451,452 to each of two latches 351,352 whose outputs are summed by adder 341. The result 422 is then provided to the third 12-bit input port of multiplexer 322.

Control circuitry 390 implements the first divide (described as F/G with reference to Eq. 1 above) by enabling select lines on mux 321 such that intermediate value 411 passes through shift register 311 (F, in parsed and serialized form) to the partial quotient generator (SRAM 325). Simultaneously, the control circuitry enables select lines on mux 322 such that intermediate value 413 passes the denominator value (G) to become the remainder of the input 425 to SRAM 325. When this is complete, latch 333 contains an estimate of the quotient F/G. The control circuitry then triggers latches 315,351 to change state and accept respective input values 415,451 representing F/G in stored form.

Control circuitry 390 then implements the second divide (described as H/J with reference to Eq. 1 above) by enabling select lines on mux 321 so that intermediate value 412 passes through shift register 312 (H, in parsed and serialized form) to the PQG (SRAM 325). Simultaneously, the control circuitry enables select lines on mux 322 such that intermediate value 414 passes the next denominator value (J) as input value 425 to SRAM 325. When this is complete, latch 333 contains an estimate of the quotient H/J. The control circuitry then triggers latch 352 to change state and accept input value 452 representing H/J in stored form. This causes adder 341 to provide a sum 422 indicative of (F/G+H/J).

Control circuitry 390 then implements the third divide (described as the right side of Eq. 1 above) by causing mux 322 to select 12-bit value 422 to pass as an input value 425 to SRAM 325. Simultaneously, control circuitry causes mux 321 to select the output from latch 315, so that the latched value 415 shifts serially (LSB first) to an input line of SRAM 325. When this is complete, latch 333 contains a divider output value 440 that approximates the expression on the right side of Eq. 1 above.

In the particular servo function of Eq. 4, divider output value 440 is then provided as an input value 460 to logic block 360, along with intermediate values 461,462. Logic block 360 then provides a system output value 470 that provides an excellent estimate of the position error.

Recalling the embodiments of FIGS. 2 & 12, devices of the present invention include a forward signal path comprising (a) a partial quotient generator (PQG) 540,325 able to generate a succession of signals 545,431 indicative of portions of a quotient, (b) an accumulator 550,331; and (c) a latch 560,333. The devices further comprise a feedback signal path emerging from the latch output 565,440. The path comprises a reducing bit shifter 570 and terminates as an input value 575,432 to the accumulator 550,331. The devices further comprise a denominator register 530,413, 414 coupled directly or indirectly to input ports of the PQG 540,325 to provide denominator values 535,413,414,422 thereto. The devices further comprise a numerator register 520,311,312,315 coupled directly or indirectly to input port(s) of the PQG 540,325 to provide a succession of portions (bits or words) comprising the numerator value 525,411,412,415. The devices further comprise at least one trigger 390 able to cause the numerator register(s) and/or the latch(es) to change state.

All of the structures described above will be understood to one of ordinary skill in the art, and would enable the practice of the present invention without undue experimentation. It is to be understood that even though numerous characteristics and advantages of various embodiments of the present invention have been set forth in the foregoing description, together with details of the structure and function of various embodiments of the invention, this disclosure is illustrative only. Changes may be made in the details, especially in matters of structure and arrangement of parts within the principles of the present invention to the full extent indicated by the broad general meaning of the terms in which the appended claims are expressed. For example, the particular elements may vary depending on the particular application for the present system while maintaining substantially the same functionality, without departing from the scope and spirit of the present invention. In addition, although the most preferred embodiment described herein is directed to a particular control system, it will be appreciated by those skilled in the art that the teachings of the present invention can be applied to other applications without departing from the scope and spirit of the present invention.

What is claimed is:

1. A device for estimating a quotient of a numerator and a denominator, comprising:
   a numerator register able to provide successive portions of the numerator;
   a denominator register operatively able to provide the denominator;
   a partial quotient generator (PQG) operatively coupled to the registers and able to receive the portions and the denominator and to generate a succession of signals indicative of portions of the quotient;
   an accumulator having a first input port, a second input port, and an output, the first input port operatively coupled to the PQG and able to receive the signals;
   a latch operatively coupled to the output of the accumulator so as to receive accumulated values; and
   a shifter operatively coupled to the latch so as to receive latched values, the shifter also operatively coupled to the accumulator's second input port so as to feed back shifted latched values to the accumulator.

2. A disc drive comprising:
   a rotatable disc include a plurality of tracks, each track having a plurality of servo position fields;
   a controllably positionable head adjacent the disc which reads the servo position fields to provide servo burst signals indicative of relative position of the head with respect to the servo position fields; and
   a servo processor including the device of claim 4 operably coupled to the head to receive the burst signals and derive therefrom the numerator and denominator, the processor configured to generate a head control signal from the estimated quotient.

3. A device for estimating a quotient of a numerator and a denominator, comprising:
   a forward signal path comprising a partial quotient generator (PQG), an accumulator, and a latch having a synchronous input, the PQG configured to generate a succession of signals indicative of portions of the quotient;
   a feedback signal path comprising a reducing bit shifter, the feedback path operatively coupled to receive the portions and to provide reduced portions to the accumulator;
   a denominator register operatively coupled to provide the denominator to the PQG;
   a numerator register having a synchronous input, configured to provide successive portions of the numerator to the PQG; and
   a controller operatively coupled to each of the synchronous inputs.

4. The device according to claim 3 in which each numerator portion comprises at least two bits.

5. The device according to claim 3 configured to receive several input values, further comprising:
   additional circuitry configured to enable the device to evaluate a formula with the values by performing at least two successive divisions upon the input values and values derived therefrom.

6. The device according to claim 5 in which the formula has the form (F/G)/(F/G+H/J), where F, C, H, and J are the input values.

7. A method for using the device of claim 6 comprising steps of:
   (a) receiving register values F, G, H, and J;
   (b) dividing F/C, and storing the result;
   (c) dividing H/J, and storing the result;
   (d) adding the results of dividing steps (b) and (c), and storing the sum; and
   (e) dividing the result of dividing step (b) by the result of adding step (d).

8. A device for estimating a quotient of a numerator and a denominator comprising:
   two multi-bit registers configured for receiving and outputting the denominator, and for receiving and outputting the numerator in successive portions; and
   means for receiving the denominator and the successive portions of the numerator and generating therefrom an estimate by iterative calculation.

9. A method for generating an estimated quotient value from a numerator value and a denominator value, comprising:
   electronically storing the numerator value and the denominator value as multi-bit representations in a memory;
   parsing the numerator value into a series of portions including a least significant (LS) portion and a next-least significant (NLS) portion each comprising at least one bit;
   electronically transmitting the LS portion and the denominator value to a partial quotient generator (PQG) which utilizes a lookup table to output a first partial quotient value comprising a multi-bit representation of a quotient of the LS portion and the denominator value;
   electronically transmitting the NLS portion to the PQG which utilizes the lookup table to output a second partial quotient value comprising a multi-bit representation of a quotient of the NLS portion and the denominator value; and
   using an accumulator to generate the estimated quotient value as a multi-bit representation in relation to the first and second partial quotient values.

10. The method of claim 9, wherein the using an accumulator step comprises reducing the first partial quotient value by a factor $2^N$ where N approximates a positive integer to provide a reduced first partial quotient value, and combining the reduced first partial quotient value with the second partial quotient value to generate the estimated quotient value.

11. The method of claim 9, wherein the NLS portion is characterized as a first NLS portion, wherein the parsing step further comprises further parsing the numerator value into a second NLS portion comprising at least one bit, wherein the method further comprises electronically transmitting the second NLS portion to the PQG which utilizes the lookup table to output a third partial quotient value comprising a multi-bit representation of a quotient of the second NLS portion and the denominator value, and wherein the using an accumulator step further comprises further generating the estimated quotient value in relation to the third partial quotient value.

12. The method of claim 9, comprising prior steps of providing the PQG with a static random access memory (SRAM), and storing the lookup table in said SRAM.

* * * * *